Dec. 15, 1931.  W. A. MARRISON  1,836,808
INDUCTANCE COIL
Filed July 31, 1929
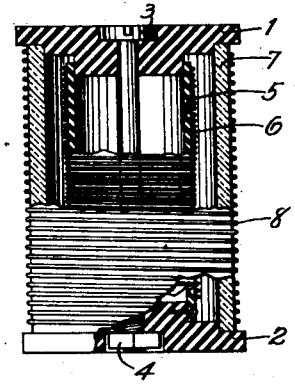
FIG. 1
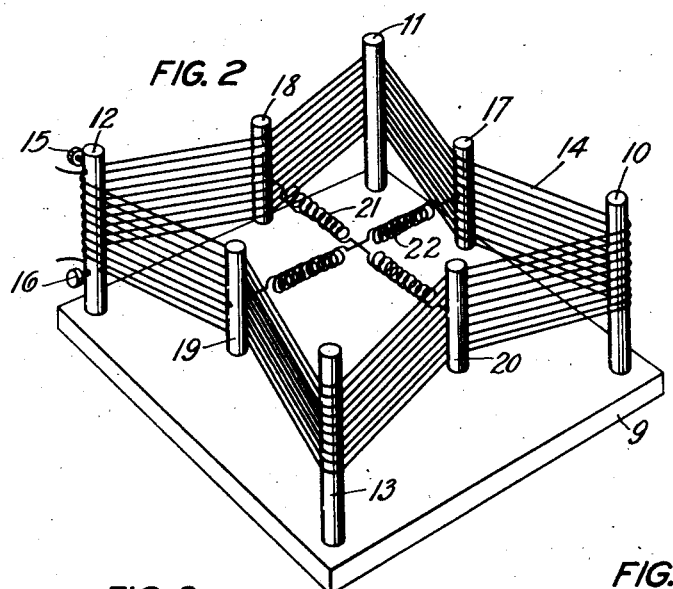
FIG. 2
FIG. 3
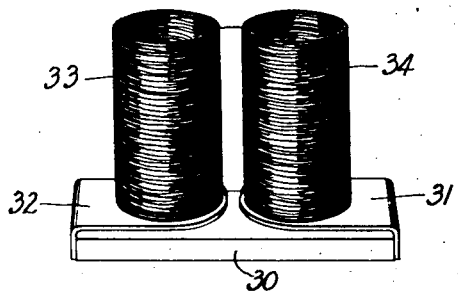
FIG. 4
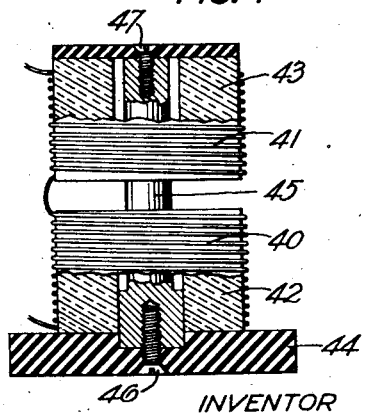
INVENTOR
W. A. MARRISON
BY Guy T. Morris
ATTORNEY Patented Dec. 15, 1931

1,836,808

UNITED STATES PATENT OFFICE

WARREN A. MARRISON, OF MAPLEWOOD, NEW JERSEY, ASSIGNOR TO WESTERN ELECTRIC COMPANY, INCORPORATED, OF NEW YORK, N. Y., A CORPORATION OF NEW YORK

INDUCTANCE COIL

Application filed July 31, 1929. Serial No. 382,205.

This invention relates to inductance coils such as are used in electrical circuits.

It is well known that inductance coils change their inductance with changes in temperature. These variations are likely to prevent the best operation of the circuit for the purpose for which it is designed and are therefore objectionable.

The object of this invention is to produce an inductance coil having a zero temperature coefficient.

The inductance of a coil depends upon a number of factors, among them its cross-sectional area, and length, and its physical relation to other coils in inductive relation to it. Due to the expansion and contraction of the conductor which forms the coil, and of the form on which the coil is wound, these factors tend to vary with variations in temperature. The constancy of inductance of a coil with temperature changes therefore is a function of the constancy of these factors or of a compensating variation of some of them with respect to others.

In one embodiment of this invention materials having zero temperature coefficients of expansion are used, for example, copper plated invar is wound on a quartz form.

As an alternative to this, phosphor bronze wire under tension may be wound on a rigid quartz form. Due to the elasticity of the wire the coil will not change dimensions, but will retain the dimensions of the quartz form.

In another embodiment means are provided for maintaining the cross sectional area of a coil substantially constant despite the expansion or contraction of the windings or frame.

If two coils are wound in series and so placed that their fields overlap, the inductance of the coils will vary with variations in their mutual inductance. If two coils so wound and placed are subjected to temperature changes, their inductance will vary principally with changes in the area and length of the coils, and with changes in their mutual inductance due to change in area. These variations may be controlled to give the coils a temperature coefficient in a desired sense, and compensated by providing means for changing the relative position of the coils and hence increasing or decreasing the mutual inductance as needed.

In a third embodiment two such coils are mounted on a base having a temperature coefficient of expansion such that the relative position of the coils is varied, with variations in temperature, and their inductance remains constant. The coils may be co-axial or not, as desired.

In the drawings Figs. 1 and 2 show inductance coils having constant area and Figs. 3 and 4 show inductance coils of variable area, whose inductance changes with changes in area are compensated.

In Fig. 1, two end pieces 1, 2, of bakelite or other suitable insulating material, with shoulders of different diameter to engage collars associated therewith, are fastened together by means of a screw-headed bolt 3 secured by a nut 4. Engaged by said end pieces 1, 2 is a collar 5 of suitable insulating material, on which is wound a plurality of turns of wire 6, to serve as a coupling coil for the coil to be hereafter described. Between said end pieces 1, 2 and engaged thereby is a second collar 7 of quartz, or other suitable insulating material having a very low or zero temperature coefficient of expansion. Wound on said collar 7 is a winding 8 consisting of a plurality of turns of wire made of invar steel, or other suitable material having a very low or zero temperature coefficient of expansion. Copper plated invar is a desirable alternative to invar as a zero temperature coefficient material. As the temperature of the form 7 or of winding 8 changes there will be no change in the dimensions of these elements. Hence, there will be no change in the area or other factors affecting the inductance of the coil 8 and it will have a zero temperature coefficient of inductance. After winding, the windings may be given a coat of cellulose acetate or other suitable binder to prevent shifting. Since such material has a rather large coefficient of expansion, it should be applied rather sparingly, especially towards the middle of the coil. This may be done by first dipping the entire coil in a weak solution and then dipping each end into this solution again.

Instead of using invar steel for the winding 8 in this figure, wire made of phosphor bronze wound under tension may be used. Due to the elasticity of this wire it will follow the quartz form instead of changing dimensions with changes in temperature.

In Fig. 2 a base 9 supports four corner posts 10, 11, 12, 13 around which is wound a winding 14 consisting of a plurality of turns of an electrical conductor whose ends are secured to binding posts 15, 16. Mid-way between the corner posts are four movable restraining members 17, 18, 19, 20. Connected to opposite restraining members are springs 21, 22. When the temperature rises, causing the base 9 to expand tending to increase the area of the coil and causing the corner posts to lengthen, tending to increase the length of the coil, the electrical conductor also lengthens. As the ends of the coil are fixed this creates a slack which is taken up by the springs attached to the restraining members and the sides of the coil are drawn inward, maintaining the area constant, or decreasing it to compensate the change in length, and thus tending to decrease the inductance of the coil, and compensating for the changes tending to increase its inductance.

In Fig. 3 a base 30 has two shelves 31, 32 extending from its ends, over said base. These shelves may be an integral part of the base or may be separate members fixedly secured thereto. Mounted on said shelves are two coils 33, 34 consisting of a plurality of turns of an electrical conductor wound in series. As the temperature increases the area of the coils 33, 34 increases, tending to increase the inductance of the coils. However, the base 30 will lengthen, tending to separate the coils, while the shelves 31, 32 will also lengthen tending to bring the coils closer together. The base being made of material having a different temperature coefficient than the shelves in one case, or if made of the same material, being of greater length, it exerts the major effect in determining the relative position of the coils so that the distance between them increases and the tendency of the coils to increase in inductance due to increase in area is compensated by this separation. The shelves may be made of different materials to effect a differential compensation, if desired.

In Fig. 4 the parts of a divided coil 40, 41 are wound in series on forms 42, 43, and coaxially secured to opposite ends of a central supporting member 45. Form 42 is secured to member 45 by a tight fit and form 43 by means of screw 47. The supporting member is secured to a base 44 by means of the screw 46. As the temperature increases, the area of the windings 40, 41 increases, tending to increase the inductance of the coil. This is compensated, however, by the increased distance between the coils caused by the expansion of the supporting member 45.

The compensating effects described above may not be the same over a large temperature range due to the different coefficients of expansion of the materials chosen at different temperatures, but the materials may be so chosen that the minimum deviation in inductance occurs at a desired temperature, so that over a considerable range in this neighborhood, the deviation of inductance from a constant value will be effectively zero.

What is claimed is:

1. A coil comprising a plurality of turns of an electrical conductor, having a zero temperature coefficient of inductance.

2. An inductance device comprising a plurality of inductance coils mounted on a base or mounting adapted to vary the distance between said coils to compensate their increase in area with temperature variations, to maintain the inductance constant.

3. An inductance element comprising a plurality of coils wound in series and a plurality of mounting members to which said coils are secured, whereby the inductance of said element remains constant irrespective of temperature variations.

4. In combination, a plurality of coaxially related coils connected in series, and means for changing the separation between said coils with temperature changes.

5. An inductance element comprising a plurality of coils electrically connected together, said element having a zero temperature coefficient of inductance.

6. In combination, an inductance element comprising a plurality of coils, and means for compensating variations in the inductance of said element due to temperature changes.

7. In combination, an inductance element comprising a plurality of coils electrically connected, and mounting means for producing a change in the spacing arrangement of said coils.

8. An inductance coil, comprising a plurality of turns of an electrical conductor having a zero temperature coefficient of expansion, wound on a form having a zero temperature coefficient of expansion.

9. An inductance coil, comprising a plurality of turns of an electrical conductor made of copper plated invar, wound on a frame made of quartz.

10. An inductance coil, comprising a plurality of turns of elastic wire wound on a frame having a coefficient of expansion equal approximately to zero.

11. An inductance coil, comprising a plurality of turns of an electrical conductor adapted to have a constant cross-sectional area irrespective of variations in temperature.

12. An inductance coil comprising a quartz form and a plurality of turns of elastic bronze wire wound thereon.

13. An inductance coil comprising a base, a plurality of supporting members supported on said base, a plurality of turns of an electrical conductor wound on said supporting members, a plurality of movable restraining members associated with said coil, and springs connected to oppositely disposed restraining members.

In witness whereof, I hereunto subscribe my name this 30th day of July, 1929.

WARREN A. MARRISON.